US008665133B2

(12) United States Patent
Khatwa et al.

(10) Patent No.: US 8,665,133 B2
(45) Date of Patent: Mar. 4, 2014

(54) METHODS AND SYSTEMS FOR PRESENTING WEATHER HAZARD INFORMATION ON AN IN-TRAIL PROCEDURES DISPLAY

(75) Inventors: Ratan Khatwa, Sammamish, WA (US); Dave Pepitone, Sun City West, AZ (US)

(73) Assignee: Honeywell International Inc., Morristown, NJ (US)

( * ) Notice: Subject to any disclaimer, the term of this patent is extended or adjusted under 35 U.S.C. 154(b) by 810 days.

(21) Appl. No.: 12/700,083

(22) Filed: Feb. 4, 2010

(65) Prior Publication Data

US 2011/0187588 A1     Aug. 4, 2011

(51) Int. Cl.
| | |
|---|---|
| *G01S 13/95* | (2006.01) |
| *G01S 7/04* | (2006.01) |
| *G01S 7/20* | (2006.01) |
| G01S 7/02 | (2006.01) |
| G01S 13/02 | (2006.01) |

(52) U.S. Cl.
USPC ........ 342/26 B; 342/26 R; 342/175; 342/176; 342/180; 342/182; 342/195

(58) Field of Classification Search
USPC ......... 342/26 R–26 D, 29–40, 175–183, 195; 702/1–4
See application file for complete search history.

(56) References Cited

U.S. PATENT DOCUMENTS

| | | | | |
|---|---|---|---|---|
| 6,560,538 | B2 * | 5/2003 | Schwinn et al. | 702/4 |
| 6,606,564 | B2 * | 8/2003 | Schwinn et al. | 702/4 |
| 6,828,922 | B1 * | 12/2004 | Gremmert et al. | 342/26 B |
| 7,042,387 | B2 * | 5/2006 | Ridenour et al. | 342/26 B |
| 7,081,834 | B2 * | 7/2006 | Ruokangas et al. | 702/3 |
| 7,109,912 | B1 * | 9/2006 | Paramore et al. | 342/26 B |
| 7,109,913 | B1 * | 9/2006 | Paramore et al. | 342/26 B |
| 7,312,743 | B2 * | 12/2007 | Ridenour et al. | 342/26 B |
| 7,570,178 | B1 | 8/2009 | Whalen et al. | |
| 7,656,343 | B1 * | 2/2010 | Hagen et al. | 342/26 B |
| 7,724,177 | B2 * | 5/2010 | Bunch et al. | 342/26 R |
| 8,059,024 | B2 * | 11/2011 | Christianson | 342/26 B |
| 8,068,050 | B2 * | 11/2011 | Christianson | 342/26 B |
| 8,111,186 | B2 * | 2/2012 | Bunch et al. | 342/26 B |
| 2002/0075171 | A1 | 6/2002 | Kuntman et al. | |

FOREIGN PATENT DOCUMENTS

JP         2002214346 A     7/2002

OTHER PUBLICATIONS

Nico De Gelder, NLR; ASSTAR Oceanic Applications; ASSTAR User Forum #1, Apr. 4, 2006, Roma.

(Continued)

*Primary Examiner* — Bernarr Gregory
(74) *Attorney, Agent, or Firm* — Shumaker & Sieffert, P.A.

(57) ABSTRACT

Systems and methods for improving situational awareness on an in-trails procedures display. A radar system transmits a radar signal and receives and stores weather radar reflectivity values into a three-dimensional buffer. A processor determines whether any of the stored weather reflectivity values indicate the presence of a weather hazard and generates one or more weather hazard icons based on the stored weather reflectivity values. An in-trail procedures display device displays the generated weather hazard icons. Wake vortex information for other aircraft is generated and outputted on the in-trail procedures display. Also, the processor receives a request for an altitude change and generates an alert when the aircraft is determined not to be cleared to transition to the requested altitude based on a projected transition, any existing weather hazards, wake vortices of proximate aircraft, and in-trail procedures.

20 Claims, 6 Drawing Sheets

(56) References Cited

OTHER PUBLICATIONS

Search Report from counterpart European application No. 10190579.2, dated May 9, 2011, 3 pp.

Examination Report from counterpart European application No. 10190579.2, dated May 16, 2011, 5 pp.

Response to Examination Report dated May 16, 2011, from counterpart European application No. 10190579.2, filed on Sep. 19, 2011, 15 pp.

Office Action from counterpart Chinese application No. 201010572221.8, dated Nov. 27, 2013, 7 pp., State Intellectual Property Office, Peking, Peoples' Republic of China.

* cited by examiner

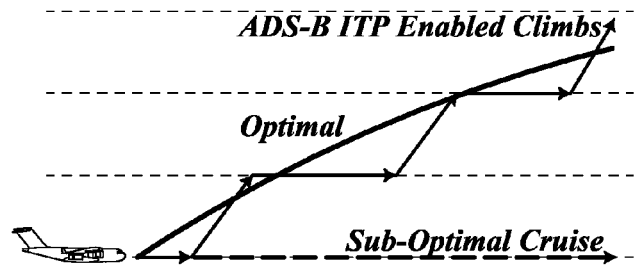
FIG. 1 *(Prior Art)*
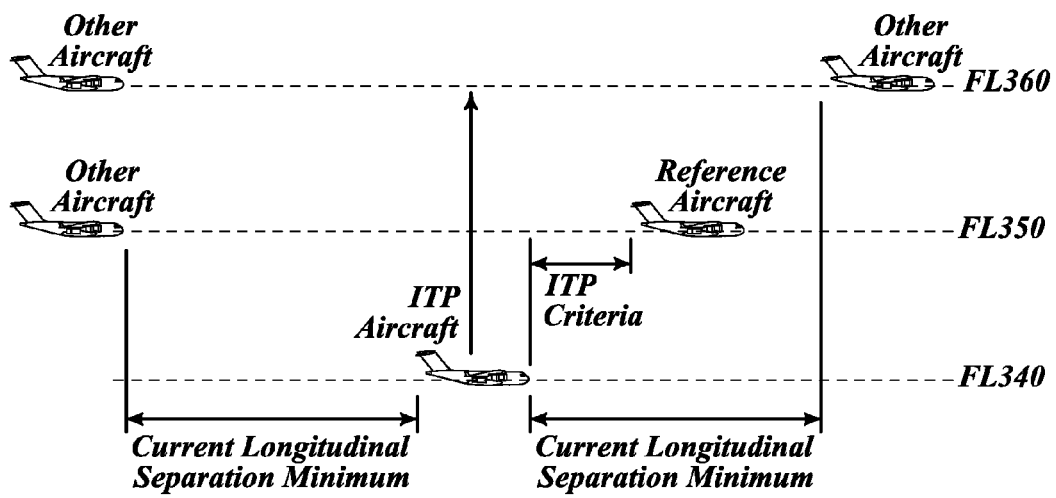
FIG. 2 *(Prior Art)*

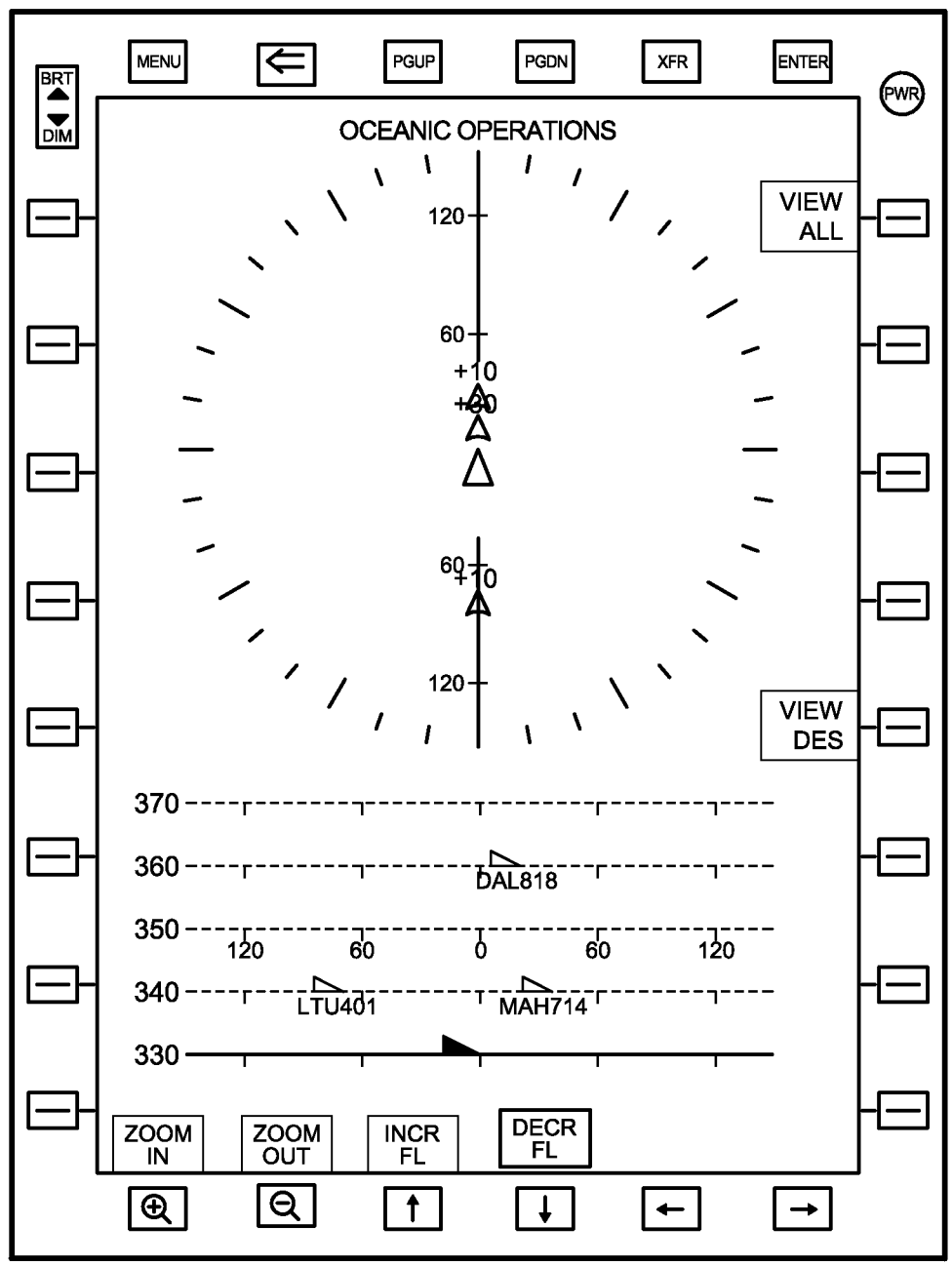
FIG. 3 *(Prior Art)*

METHODS AND SYSTEMS FOR PRESENTING WEATHER HAZARD INFORMATION ON AN IN-TRAIL PROCEDURES DISPLAY

GOVERNMENT INTEREST

The invention described herein was made in the performance of work under U.S. Government Contract No. DTFAWA-09-1-0001, Mod 003/Effective Sep. 14, 2009 with the FAA. The Government may have rights to portions of this invention.

BACKGROUND OF THE INVENTION

Efficient oceanic operations normally require flight level changes. Climbs or descents provide optimal performance to take advantage of favorable winds or to avoid turbulence.

Current oceanic operations limit opportunities for flight level changes for a number of reasons:

Flights operate along same routes at about the same time (locally dense traffic);

Reduced surveillance performance (compared with radar) results in large separation minima for safe procedural separation.

Automatic dependent surveillance-broadcast (ADS-B) in-trail procedures (ITP) are airborne ADS-B enabled climbs and descents through otherwise blocked flight levels. ITP is based on an approved International Civil Aviation Organization (ICAO) procedure whereby a controller separates aircraft based on information derived from cockpit sources that is relayed by the flight crew.

ITP allows a leading or following aircraft on the same track to climb or descend to a desired flight level through flight levels occupied by other aircraft. An ITP display enables a flight crew to determine if specific criteria for an ITP are met with respect to one or two reference aircraft at intervening flight levels. These criteria ensure that the spacing between the estimated positions of the ITP aircraft and reference aircraft always exceeds the ITP separation minimum of 10 NM, while vertical separation does not exist during the climb or descent. Once the flight crew has established that the ITP criteria are met, they request an ITP climb or descent, identifying any reference aircraft in the clearance request. Air Traffic Control (ATC) must determine if standard separation will be met for all aircraft at the requested flight level—and at all flight levels between the initial flight level and requested flight level. If so, a standard (non-ITP) flight level change clearance is likely to be granted. Otherwise, if the reference aircraft are the only blocking aircraft, the controller evaluates the ITP request. ATC determines if the reference aircraft have been cleared to change speed or change flight level, or are about to reach a point at which a significant change of track will occur. The controller also ensures that the requesting aircraft is not referenced in another procedure. ATC also ensures that the positive Mach difference with the reference aircraft is no greater than 0.06 Mach. If each of these criteria are satisfied, then ATC may issue the ITP flight level change clearance.

An example of an ITP climb is shown in FIGS. 1 and 2. An ITP aircraft is behind a reference aircraft that is at a higher intervening flight level (FL350). Standard air traffic control (ATC) procedures apply to the other aircraft (two aircraft at FL360 and one at FL350).

ITP requires new airborne equipment to provide improved information about nearby traffic. ADS-B data broadcast from these aircraft provide more accurate position data than currently available to oceanic controllers. The more accurate airborne surveillance data facilitate safe flight level changes through intervening flight levels. The airborne ITP system receives ADS-B data that includes flight identification, altitude, aircraft position, groundspeed and quality-of-data information. The ITP system displays the information derived from received ADS-B data on traffic displays such as a cockpit display of traffic information (CDTI). Both plan-view and vertical situational awareness displays (VSAD) are possible, see FIG. 3.

SUMMARY OF THE INVENTION

The present invention provides systems and methods for improving situational awareness on an in-trail procedures display. A radar system transmits a radar signal and receives and stores weather radar reflectivity values into a three-dimensional buffer. An example processor determines whether any of the stored weather reflectivity values indicate the presence of a weather hazard and generates one or more weather hazard icons based on the stored weather reflectivity values. An in-trail procedures display device displays the generated weather reflectivity and weather hazard icons. Wake vortex information for other aircraft is generated and outputted on the in-trail procedures display. Also, the processor receives a request for an altitude change and generates an alert when the aircraft is determined not to be cleared to transition to the requested altitude based on a projected transition, any existing weather hazards, wake vortices of proximate aircraft, and in-trail procedures.

BRIEF DESCRIPTION OF THE DRAWINGS

Preferred and alternative embodiments of the present invention are described in detail below with reference to the following drawings:

FIGS. 1 and 2 illustrate side views of an aircraft performing altitude changes during oceanic flight operations;

FIG. 3 illustrates an in-trail processing (ITP) display formed in accordance with the prior art;

DETAILED DESCRIPTION OF THE INVENTION

Figure 4:
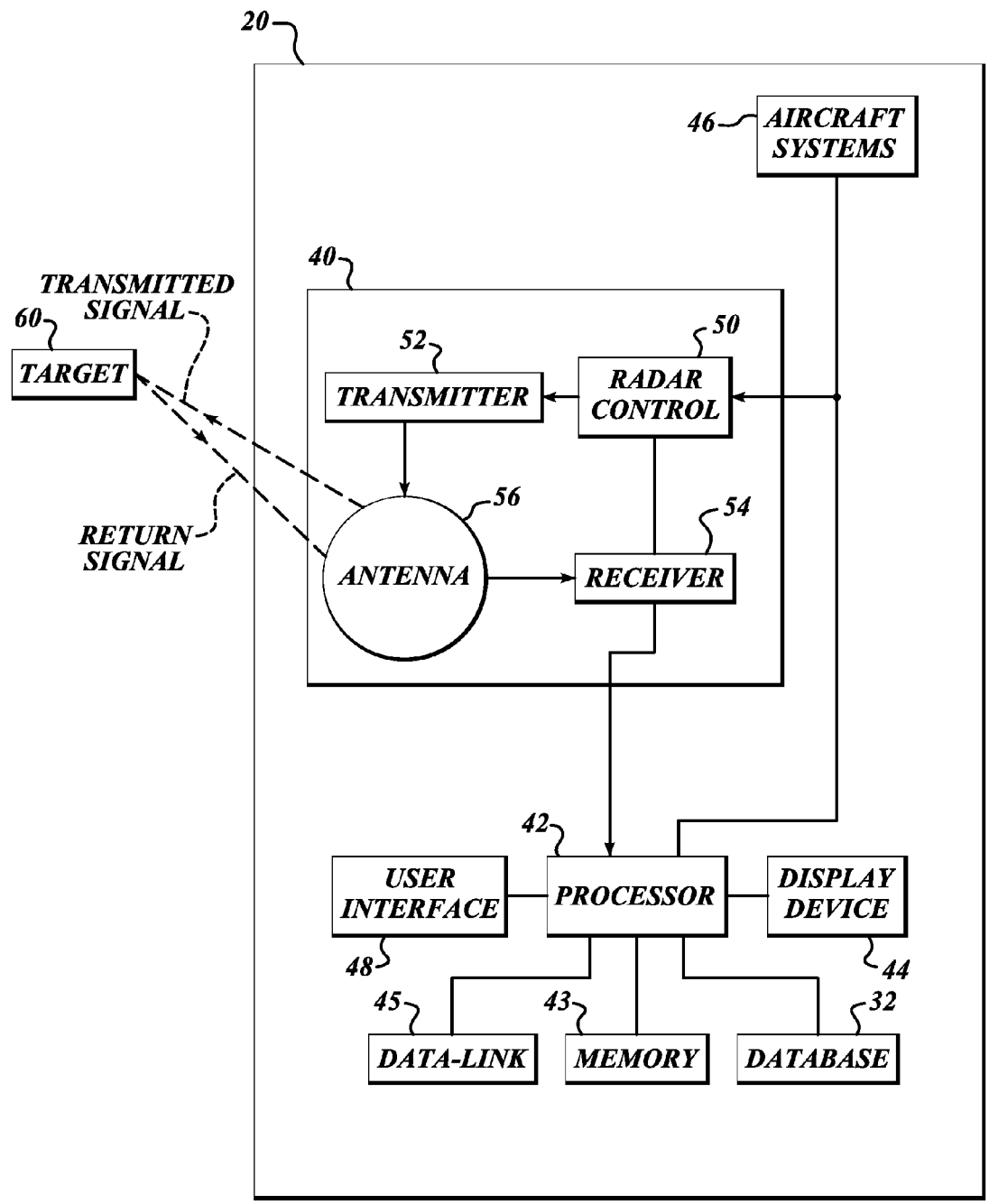
FIG. 4 illustrates a schematic diagram of a system formed in accordance with an embodiment of the present invention.

FIG. 4 illustrates an embodiment of a system for providing improved in-trail procedures (ITP) functionality on an aircraft 20. The exemplary system includes a weather radar system 40, a processor 42, memory 43, an ITP display device 44, a data-link (e.g., ADS-B) 45, a user interface 48, and a memory 43, and other aircraft systems 46. An example of the radar system 40 includes a radar controller 50, a transmitter 52, a receiver 54, and an antenna 56. The radar controller 50 controls the transmitter 52 and the receiver 54 for performing the sending and receiving of signals through the antenna 56. The weather radar system 40 and the processor 42 are in signal communication with the aircraft systems 46.

Radar relies on a transmission of a pulse of electromagnetic energy, referred to herein as a signal. The antenna 56 narrowly focuses the transmission of the signal pulse in comparison with the whole breadth of a desired downrange image. Like the light from a flashlight, this narrow signal illuminates any objects (target 60) in its path and illuminated objects reflect the electromagnetic energy back to the antenna.

Reflectivity data corresponds to that portion of a radar's signal reflected back to the radar by liquids (e.g., rain) and/or frozen droplets (e.g., hail, sleet, and/or snow) residing in a weather object, such as a cloud or storm, or residing in areas proximate to the cloud or storm generating the liquids and/or frozen droplets.

The radar controller 50 or another processor calculates the distance of the weather object relative to the antenna 56, based upon the length of time the transmitted signal pulse takes in the transition from the antenna 56 to the target 60 and back to the antenna 56. The relationship between distance and time is linear as the velocity of the signal is constant, approximately the speed of light in a vacuum.

The memory 43 includes a three-dimensional volumetric buffer for storing the reflectivity data. The processor 42 has the capabilities of inferring lightning, hail, or turbulence based on the reflectivity values stored in the volumetric buffer. The processor 42, having access to the volumetric buffer, provides weather and wake vortex information to the ITP display device 44.

An ITP climb or descent request generated by the ITP processor 42 includes weather information from the weather radar system 40 and wake vortex information and information about any ITP aircraft or weather based on information received via the data-link 45. The pilot gets the additional weather information and makes an altitude change request based on that additional data if appropriate. In one embodiment, the Oceanic Air Traffic Controller (OATC) also gets this information, i.e. it is transmitted to the OATC via the ITP request.

The ITP plan view, vertical situation awareness display (VSAD) and/or three-dimensional display devices 44 present all relevant data. This data includes:

Airborne three-dimensional weather reflectivity data;
Airborne weather hazard information, such as presence of turbulence, convective activity, hail, lightning;
Predictive wake vortex information;
Data-linked winds-aloft data;
Data-linked weather (service provided); and
Data-linked weather from other aircraft (e.g., PIREPS, temp, pressure).

An example weather radar system is Honeywell's IntuVue™ Weather Radar, which encompasses a three-dimensional volumetric buffer. The radar system 40 continuously scans the entire three-dimensional space in front of the aircraft 20 and stores all reflectivity data in an earth-referenced, three-dimensional (or "volumetric") memory buffer (memory 43). The buffer is continuously updated with reflectivity data from new scans. The data stored in the buffer are compensated for aircraft movement (speed, heading, altitude). The data in the buffer are updated at a rate of every 30 seconds, for example. The three-dimensional method employs a scanning scheme that provides full coverage over a total of −15 to +15 degrees tilt control range. The reflectivity data are extracted from the buffer to generate the desired display views without having to make (and wait for) view-specific antenna scans. In one embodiment, this extraction and image generation are performed at one-second intervals (compared to four seconds for conventional radar). With the three-dimensional volumetric buffer data, the display presentation is not constrained to a single tilt-plane that is inherent to conventional radar.

The present invention provides weather awareness enhancements on the ITP display device 44 that include:

Three-dimensional weather reflectivity data;
Weather hazard information, such as the presence of turbulence, convective activity, hail, volcanic ash, lightning;
Wake vortex;
Winds-aloft data;
Data-linked weather (from service providers); and
Data-linked weather from other aircraft.

Figure 5:
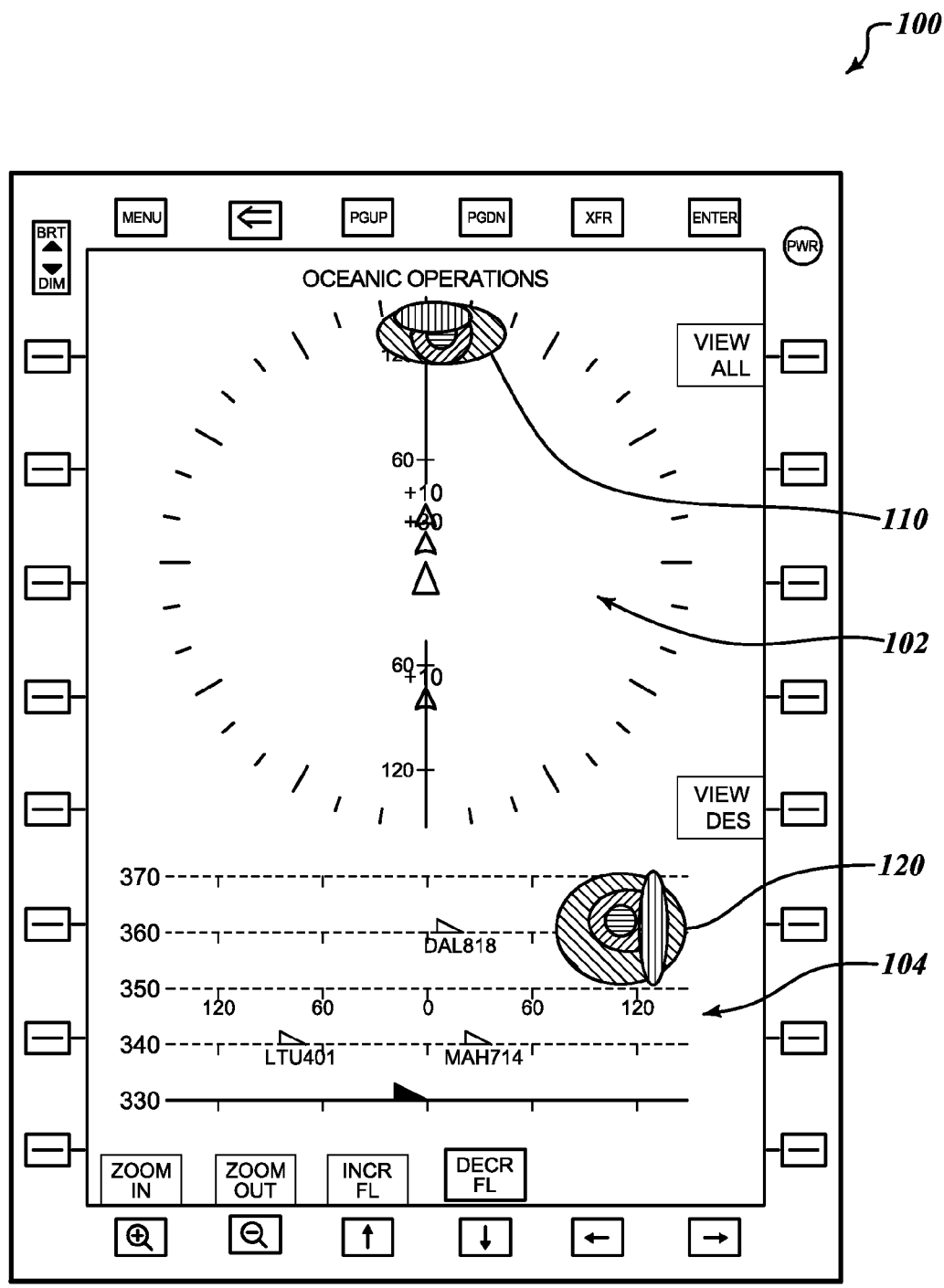
FIGS. 5 and 6 illustrate ITP displays showing functionality according to embodiments of the present invention.

FIG. 5 shows three-dimensional reflectivity data integrated on an ITP display 100 having a plan view section 102 and a vertical situation awareness (VSA) section 104. Turbulence data is also shown. In one embodiment, the weather reflectivity data retrieved from the volumetric weather buffer are converted in the same way that the icons of other aircraft are displayed to reflect ITP position (actual range may also be used) when presented on the VSA section 104 of the ITP display 100. In other words, the displayed location of other aircraft on the ITP display device 44 takes into account motion/convergence of the other aircraft to the flight path of the own aircraft. The motion and calculated center position of the detected weather on current track of the ownship and within a specified lateral distance is also used to adjust the associated icon's longitudinal ITP position (Or range on the alternative embodiment) on the ITP display device 44. In another embodiment, this conversion may also be performed for the icon presented in the plan view section 102. The detected weather condition is presented as a first icon(s) 110 in the plan view section 102 and as a second icon(s) 120 in the VSA section 104.

In another embodiment the actual range (and therefore not ITP distance) is used when weather reflectivity data are presented on the VSA section 104 of the ITP display 100. Thus, the x-axis on the VSA section 104 could either be ITP distance or actual range. This implies that the pilot would have three possible displays (Plan View, ITP based VSA display with other aircraft, and range based VSA display with weather and with or without traffic).

Figure 6:
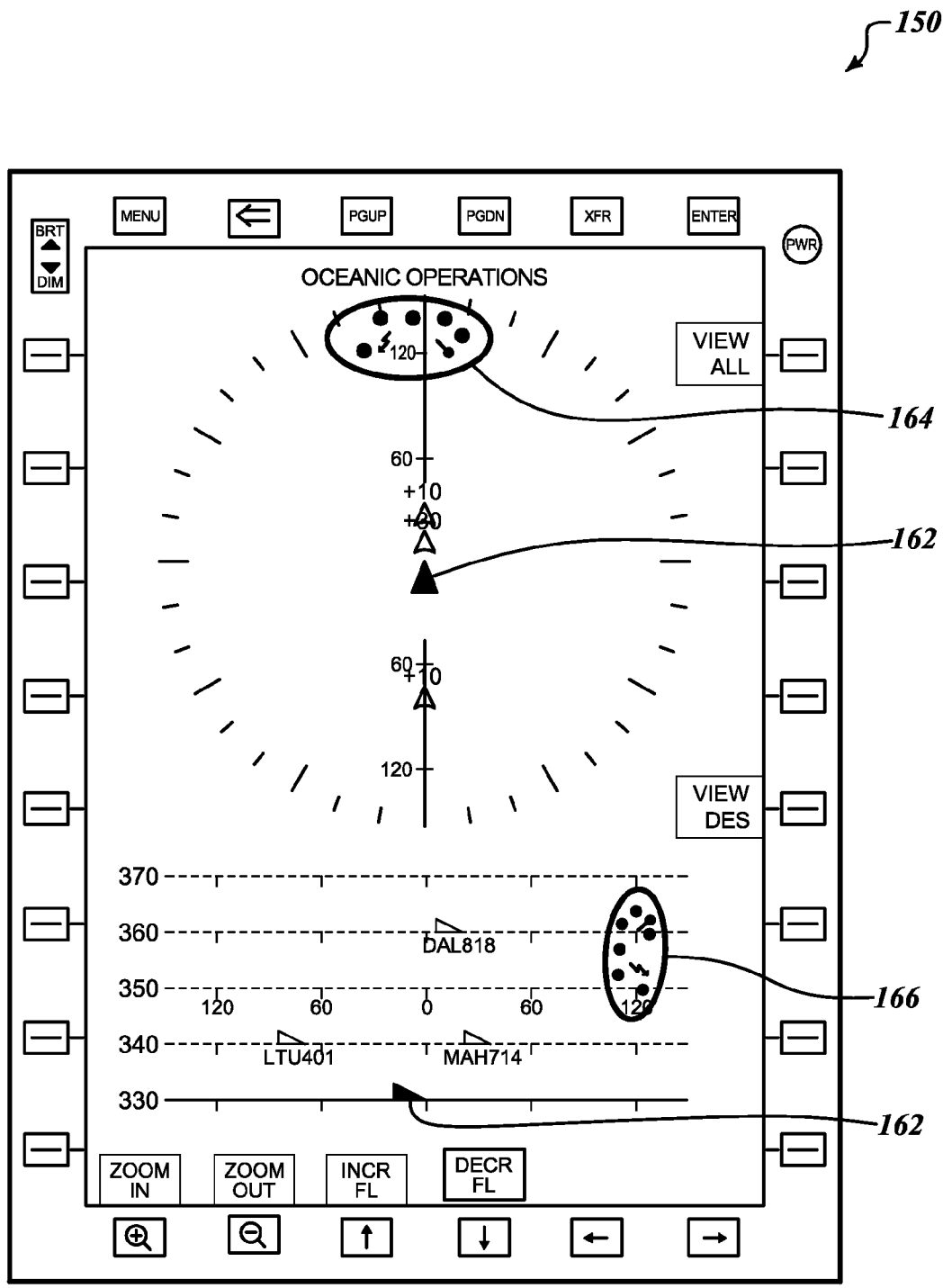

FIG. 6 shows lightning and hail icons included with detected and displayed weather conditions 164, 166 shown in a plan view and VSA sections of an ITP display 150. An "ownship" icon 162 is shown in both sections of the ITP display 150.

Figure 7A:
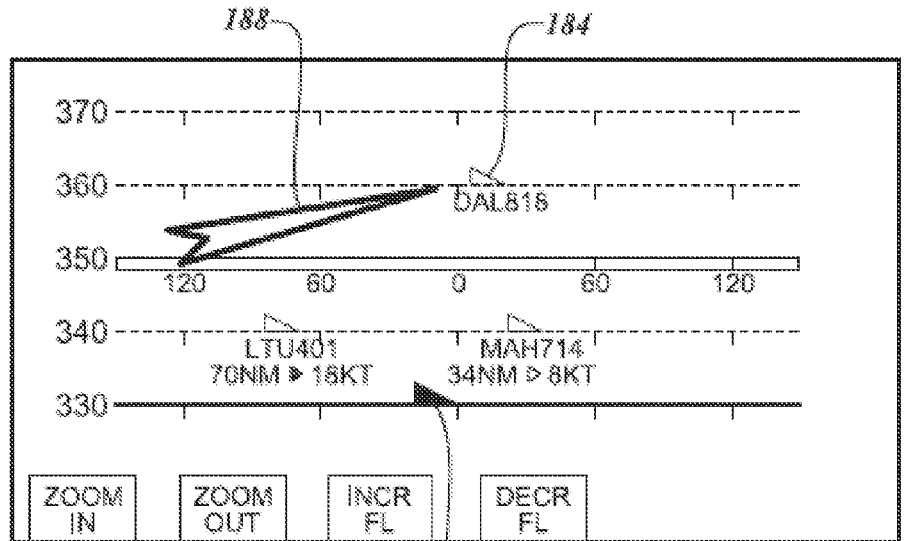
FIG. 7A illustrates a partial ITP display showing wake vortex functionality.
Figure 7B:
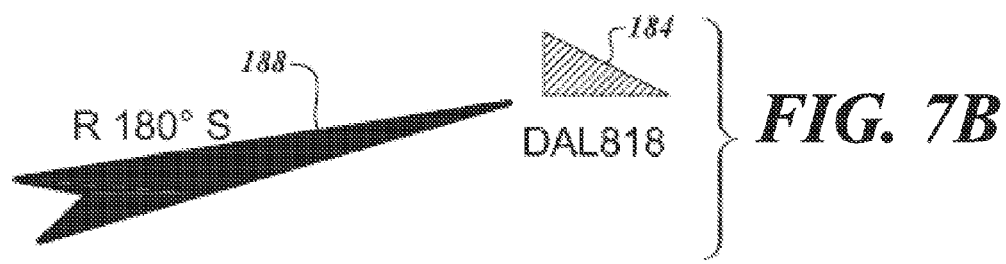
FIG. 7B illustrates a wake vortex icon generated in accordance with an embodiment of the present invention.

FIGS. 7A and 7B illustrate a VSA section of an ITP display 180 that shows relevant wake vortex information based on information stored in the memory 43 and/or received from the target aircraft via the data-link 45. A wake vortex icon 188 shows a wake vortex plume from a target aircraft icon 184 (Delta Airlines flight 818). The predictive driftdown path is shown, trailing distance, width, rotational velocity (R 180° S=180° of roll per second to the right). Other identifier may include C-Roll 180° sec which means clockwise roll rate of 180 deg sec and CC-Roll 180° sec which means counter-clockwise roll at 180° sec. Wake turbulence is predicted from aircraft make/model, speed, altitude, and ambient conditions (i.e. ISA temperature, pressure). The ADS-B message (via the data-link device 45) transmits the aircraft make/model, altitude, speed, etc. The processor 42 correlates the received information with on-board stored wake turbulence predictive algorithms and generates the intuitive wake vortex icon 188 that allows the crew to quickly assess their potential for wake encounters before climbing or descending.

Figure 8:
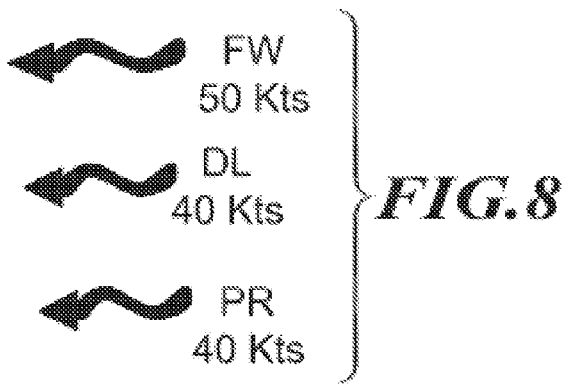
FIG. 8 illustrates various winds-aloft icons.

Other icons can be presented on ITP displays. Exemplary icons show the vertical dimensions of icing, winds aloft, etc. Forecast or reported winds aloft, outside air temperature (OAT) and pressure, and ride reports (i.e., PIREPS) can all be used to inform the pilot when received, transformed, and rendered on the ITP display device 44. Aircraft ahead of own ship data-link actual conditions, while weather service providers transmit forecast conditions as well as actual weather along the route of flight. This weather data will in some cases have to be extrapolated into a three-dimensional model, while, in other cases, the three-dimensional data will be packaged by the provider. As shown in FIG. 8, a winds-aloft icon may include velocity and source of information. Examples of the source of information include forecast winds (FW), data-linked winds (DL) from aircraft ahead and at same altitude, and pilot reports (PIREPS) winds (PR) that are data-linked to "ownship".

One of the key tasks for the flight crew during an ITP climb or descent is to select the desired flight level prior to detecting potentially blocking aircraft. After the crew selects a desired flight level, that flight level is highlighted on the vertical profile section of the ITP display. In one embodiment, the processor 42 provides the flight crew with a visual, aural, and/or tactile alert if the desired flight level passes through or is within predefined lateral and vertical constraints from the hazardous area. Hazards can include turbulence, hail, lightning, convective activity, volcanic ash or a wake vortex. Other hazards may include violating ITP procedure if the altitude change is executed. The visual alert is provided on the VSAD section of the ITP display, plan-view and/or three-dimensional display. FIG. 7A shows wake vortex and altitude transition alerts on the ITP display 180. The desired flight level (350) passes through a hazardous area (wake vortex) and thus the flight level is visually coded (e.g., flashing and/or differently colored (e.g., amber)). An audio and/or visual text message "check desired flight level" can also be presented.

A menu system can be provided (via the user interface 48) to the pilot so that the pilot is able to select or declutter just those weather objects of interest and that are relevant to the crew's decision making Alerting can be provided to the crew to make it obvious that desired flight level or track change may take the aircraft into an area of hazardous weather. In another embodiment, an options allows the crew to select ITP distance or actual range based displays.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

The embodiments of the invention in which an exclusive property or privilege is claimed are defined as follows:

1. A method performed on an aircraft, the method comprising:
   automatically transmitting a radar signal and receiving weather radar reflectivity values;
   automatically storing the received weather reflectivity values in a three-dimensional buffer;
   determining whether any of the stored weather reflectivity values indicate the presence of a weather hazard;
   automatically generating one or more weather hazard icons based on the stored weather reflectivity values; and
   automatically displaying the generated weather hazard icons on an in-trail procedures (ITP) display.

2. The method of claim 1, wherein automatically generating comprises automatically generating the icons based on ITP position information associated with the respective weather hazard and displaying comprises displaying the icons on at least a vertical situational awareness display of the ITP display.

3. The method of claim 2, wherein displaying comprises further displaying the icons on at least one a plan view display or a three-dimensional display.

4. The method of claim 3, wherein displaying comprises further displaying the icons on at least one a plan view display or a three-dimensional display.

5. The method of claim 1, wherein automatically generating comprises automatically generating the icons based on position information associated with the respective weather hazard and displaying comprises displaying the icons on at least a vertical situational awareness display of the ITP display.

6. The method of claim 1, wherein automatically generating comprises automatically generating at least one of a lightning icon if the previously stored weather reflectivity values indicate the presence of lightning or a hail icon if the previously stored weather reflectivity values indicate the presence of hail.

7. The method of claim 1, further comprising:
   receiving Doppler information;
   automatically generating a turbulence icon, if the received Doppler information indicates the presence of turbulence; and
   automatically displaying the turbulence icon on the ITP display.

8. The method of claim 1, further comprising:
   automatically receiving flight identification information from one or more target aircraft; and
   automatically generating and displaying on the ITP display a wake vortex icon for the one or more target aircraft when the target aircraft is determined to be within a predefined window from the present aircraft, based on position information of the target and present aircraft.

9. The method of claim 8, wherein automatically generating the wake vortex is based on the received aircraft identification, performance information associated with the aircraft identification, ambient condition information and a wake vortex algorithm stored in local memory of the present aircraft.

10. The method of claim 1, further comprising:
    receiving a request from a flight crew of the present aircraft for an altitude change;
    automatically determining whether the aircraft is cleared to transition to the requested altitude; and
    automatically outputting an alert when the aircraft is determined not to be cleared to transition to the requested altitude,
    wherein the request is determined clear to transition if a projected transition does not conflict with an existing weather hazard, wake vortex of another aircraft, and does not violate in-trail procedures.

11. A system located on an aircraft, the system comprising:
    a memory device;
    a radar system configured to automatically transmit a radar signal and receive and store weather radar reflectivity values into a three-dimensional buffer in the memory device;
    a processor in signal communication with the memory device, the processor configured to:
       determine whether any of the stored weather reflectivity values indicate the presence of a weather hazard; and
       generate one or more weather hazard icons based on the stored weather reflectivity values; and
    an in-trail procedures display device configured to display the generated weather hazard icons.

12. The system of claim 11, wherein the in-trail procedures display comprises a vertical situational awareness display that outputs the generated weather hazard icons based on ITP position information associated with the respective weather hazard.

13. The system of claim 12, wherein the in-trail procedures display comprises at least one of a plan view display or a three-dimensional display.

14. The system of claim 11, wherein the in-trail procedures display comprises a vertical situational awareness display that outputs the generated weather hazard icons based on position information associated with the respective weather hazard.

15. The system of claim 14, wherein the in-trail procedures display comprises at least one of a plan view display or a three-dimensional display.

16. The system of claim 11, wherein the weather hazard icons comprise at least one of a lightning icon if the previously stored weather reflectivity values indicate the presence of lightning or a hail icon if the previously stored weather reflectivity values indicate the presence of hail.

17. The system of claim 11, wherein the processor is further configured to:
receive Doppler information;
automatically generate a turbulence icon, if the received Doppler information indicates the presence of turbulence; and
automatically display the turbulence icon on the ITP display.

18. The system of claim 11, wherein the processor is further configured to:
receive flight identification information from one or more proximate aircraft; and
generate a wake vortex for the one or more proximate aircraft when the proximate aircraft is determined to be within a predefined window from the present aircraft, based on position information of the present and proximate aircraft,
wherein the in-trail procedures display device displays the generated wake vortex,
wherein the processor generates the wake vortex based on aircraft identification information, performance information associated with the aircraft identification, ambient condition information and a wake vortex algorithm stored in local memory of the present aircraft.

19. The system of claim 11, wherein the processor is further configured to:
receive a request for an altitude change; and
generate an alert when the aircraft is determined not to be cleared to transition to the requested altitude based on a projected transition, any existing weather hazards, wake vortices of proximate aircraft, and in-trail procedures,
wherein the in-trail procedures display device outputs the generated alert.

20. A system on an aircraft, the system comprising:
a means for transmitting a radar signal and receiving weather radar reflectivity values;
a means for storing the received weather radar reflectivity values in a three-dimensional buffer;
a means for determining whether any of the stored weather reflectivity values indicate the presence of a weather hazard;
a means for generating one or more weather hazard icons based on the stored weather reflectivity values;
a means for displaying the generated weather hazard icons on an in-trail procedures display;
a means for receiving flight identification information from one or more target aircraft;
a means for generating and displaying a wake vortex for the one or more target aircraft when the target aircraft is determined to be within a predefined window from the present aircraft, based on position information of the present and target aircraft;
a means for receiving a request from a flight crew of the aircraft for an altitude change;
a means for determining whether the aircraft is cleared to transition to the requested altitude; and
a means for outputting an alert when the aircraft is determined not to be cleared to transition to the requested altitude,
wherein the request is determined clear to transition if a projected transition does not conflict with an existing weather hazard, wake vortex of another aircraft, and does not violate in-trail procedures.

* * * * *